United States Patent [19]

Worm

[11] 4,233,421
[45] Nov. 11, 1980

[54] FLUOROELASTOMER COMPOSITION CONTAINING SULFONIUM CURING AGENTS

[75] Inventor: Allan T. Worm, North St. Paul, Minn.

[73] Assignee: Minnesota Mining and Manufacturing Company, St. Paul, Minn.

[21] Appl. No.: 15,171

[22] Filed: Feb. 26, 1979

[51] Int. Cl.$^3$ .......................... C08F 8/40; C08F 8/34; C08F 14/22

[52] U.S. Cl. .................................... 525/343; 260/330; 525/331; 525/341; 525/348; 525/349; 548/100; 549/1; 568/18

[58] Field of Search ............... 525/343, 348, 349, 331; 526/247, 249, 253, 254, 255

[56] References Cited

U.S. PATENT DOCUMENTS

| | | | |
|---|---|---|---|
| 2,807,648 | 9/1957 | Pitt | 260/607 B |
| 3,655,727 | 4/1972 | Patel | 260/31.2 R |
| 3,712,877 | 1/1973 | Patel | 260/41 |
| 3,844,877 | 10/1974 | Wessendorf | 252/502 |
| 3,933,732 | 1/1976 | Schmiegel | 260/42.27 |
| 3,988,502 | 2/1979 | Patel | 526/18 |
| 4,120,866 | 10/1978 | Winkler | 260/315 |

OTHER PUBLICATIONS

Weigand, G. H., et al., "Synthesis and Reactions of Triarylsulfonium Halides", J. Org. Chem., 36, 3149, 3155, (1971).

*Primary Examiner*—C. A. Henderson
*Attorney, Agent, or Firm*—Cruzan Alexander; Donald M. Sell; William G. Ewert

[57] ABSTRACT

A thermally stable, curable fluoroelastomer composition containing sulfonium curing agent is described. The composition is curable in reactive admixture with an inorganic acid acceptor and includes:

(a) a fluoroelastomer comprising vinylidene fluoride;
(b) at least one triorgano sulfonium compound; and
(c) at least one aromatic polyhydroxy compound.

7 Claims, No Drawings

FLUOROELASTOMER COMPOSITION CONTAINING SULFONIUM CURING AGENTS

This invention relates to a method for crosslinking fluorinated polymers and crosslinking compositions for use therein. In one aspect this invention relates to a new vulcanization admixture for producing a crosslinked product of improved thermal stability. In another aspect this invention relates to the modification of the characteristics of linear saturated polymers containing halogen substituents on the carbon atoms, particularly those polymers capable of having elastomeric properties.

BACKGROUND OF THE INVENTION

In general, linear non-crosslinked polymers are thermoplastic in nature and exhibit continuous flow under the influence of heat and pressure. Such polymers can be resoftened as often as desired and are usually soluble in selected solvents. In contrast, crosslinked polymers are generally thermoset, i.e., incapable of being resoftened without decomposition, and are insoluble in most solvents. A linear polymer may nevertheless contain a small number of crosslinkages without losing its thermoplastic properties. It is often desirable to convert thermoplastic polymers into thermoset, crosslinked or partially crosslinked polymers in order to decrease their solubility and flow properties and to obtain a harder and tougher product. Crosslinking of thermoplastic polymers to prepare elastomers therefrom is commonly referred to as vulcanization.

Among the thermoplastic polymers which are more difficult to vulcanize are those prepared by the polymerization of halogenated monoolefins, such as, for example, the copolymers of chlorotrifluoroethylene and vinylidene fluoride, the copolymers of perfluoropropene and vinylidene fluoride and the copolymers of perfluoropropene, vinylidene fluoride and tetrafluoroethylene. Many of these fluorinated thermoplastic polymers have unique and valuable properties such as acid and base resistance and thermal stability. When it is desired to retain their unique properties and at the same time decrease thermoplastic flow and solubility, the polymers are crosslinked.

The use of various materials to vulcanize or cure halogenated monoolefins has been suggested in a number of issued patents. For example, polymers of halogenated monoolefins, especially fluorinated monoolefins, have been vulcanized with curing systems which contain quaternary ammonium or phosphonium compounds, e.g., U.S. Pat. Nos. 3,655,727, 3,712,877, 3,844,877, 3,933,732. The performance characteristics of the cured fluoroelastomers produced using the above conventional vulcanizing agents are adequate for most applications. However, conventionally vulcanized fluoroelastomers while being stable under all but the most extreme chemical and thermal environments are found to be susceptible to degradation in certain high performance applications involving long term exposure to elevated temperatures, especially in harsh chemical environments, e.g., expansion joints in flue gas systems. The present invention provides novel vulcanizing agents which cure polymers of fluoromonoolefins in much the same manner as conventional vulcanizing agents yet unexpectedly provides cured fluoroelastomers with improved long term thermal stability, especially in the presence of harsh chemical environments.

BRIEF SUMMARY OF THE INVENTION

It is therefore an object of this invention to provide a new and improved fluoropolymer crosslinking system.

Another object of this invention is to provide a new curable, fluoropolymer admixture.

Still another object of this invention is to provide a method for crosslinking fluoroelastomers.

A further object of this invention is to provide a cured fluorinated elastomer with improved long term thermal stability, i.e., resistance to degradation even upon long term exposure to high temperatures.

Other objects and advantages of the present invention will become apparent to those skilled in the art from the accompanying description and disclosure.

Accordingly, in one aspect the invention provides an elastomeric composition or admixture curable in reactive association with an inorganic acid acceptor to produce a cured elastomer with increased resistance to degradation from extended exposure to elevated temperatures. The curable elastomeric composition or admixture comprises the following components:

(a) a fluorinated elastomeric copolymer of vinylidene fluoride and at least one terminally unsaturated, at least half halogenated, fluoromonoolefin containing at least one fluorine atom substituent on each double bonded carbon atom, each carbon atom of said fluoromonoolefin being substituted only with fluorine, chlorine, hydrogen or a lower fluoroalkyl or fluoroalkoxy radical, at least 10 percent of the chain carbon atoms of said copolymer being —CH$_2$— units;

(b) at least one triorgano sulfonium compound; and (c) at least one aromatic polyhydroxy compound; the above curable composition admixed with at least one inorganic acid acceptor when curing of the composition is desired.

DETAILED DESCRIPTION

The cured fluoroelastomers produced in the practice of the present invention can be advantageously employed in situations where they are exposed to elevated temperatures and/or corrosive chemicals for long periods of time. In addition to being used as the matrix in expansion joints of flue gas scrubbers, the cured fluoroelastomers herein can be advantageously utilized in various down hole geothermal or petroleum drilling applications such as gaskets, seals, valve linings, etc. Further, the cured fluoroelastomers have many potential engine compartment applications, e.g., insulating seals, in the transportation industry.

Although the mechanism is not fully understood, the combination of each of the above components in a curing or vulcanization system displays an effect not attributable to any one specific component or any combination less than the required components of the above curing system, resulting in, as will be hereinafter discussed, increased resistance to degradation of properties under long term exposure to high temperature, even under strongly acidic or basic conditions. Another valuable attribute of the above curing system is the latitude permissible in the formulation. Minor changes in the proportions of the components within wide limits do not drastically affect fluoroelastomer processability, such as its ability to cure rapidly and yet to be milled without scorching.

The vulcanizable polymers which are cured according to this invention are linear, saturated, fluorinated polymers which contain unreactive neutral substituents such as hydrogen, fluorine, bromine, chlorine, fluoroalkyl, perfluoroalkyl and perfluoroalkoxy, the polymers being at least half halogenated. By "half halogenated" it is meant that at least one half of the carbon bonded hydrogen atoms of the analogous non-halogenated monomer or polymer are replaced by fluorine, chlorine or bromine. The preferred vulcanizable polymers are at least half fluorinated; however, it is critical that the polymer chain include —CH$_2$— units. The linear, fluorinated elastomers useful herein generally contain disordered, saturated, fluorinated carbon chains which include a substantial number of —CH$_2$— units, usually at least 10 percent of the chain carbon atoms. Disorder in the carbon chains is ordinarily achieved by the copolymerization of at least two monoolefinic compounds (i.e., having single ethylenic unsaturation) of the type hereinafter described. When one of the monoolefinic compounds contains three or more carbon atoms, alkyl side groups, e.g. methyl, ethyl, etc., are present in the final polymer, and these alkyl groups are preferably perhalogenated, most preferably perfluorinated. Points of unbalance in the carbon chain, which are necessary for elastomeric properties, are provided by these side groups. Such side groups cause a bending of the linear carbon chain and thus restrict packing of the molecular chains to the highly crystalline, ordered arrangement characteristic of non-elastomeric polymers. However, unbalance is also provided by the presence of other unsymmetrical units in the linear carbon chain, such as —CFCl—. Irrespective of the units providing such points of unbalance, whether by two physically different substituent atoms or by a side group on a chain carbon atom, at least 10 percent of the chain carbon atoms should be unbalanced.

The linear, saturated, fluorinated carbon chain in the elastomers may also contain chlorine substituents, provided a single chain carbon atom has no more than one chlorine attached thereto. The presence of more than one chlorine substituent on a single chain carbon atom produces a point of rigidity in the chain, decreasing the flexibility of the chain, and accordingly, its elastomeric properties.

Among the saturated polymers which may be crosslinked in accordance with this invention are the fluorinated elastomeric copolymers of vinylidene fluoride with chlorotrifluoroethylene, 2-chloroperfluoropropene, a fluorinated methyl vinyl ether (e.g., CF$_3$OCF=CF$_2$), perfluoropropene, tetrafluoroethylene, 1-hydroperfluoropropene (i.e., CHF=CFCF$_3$), dichlorodifluoroethylene, trifluoroethylene, and 1,1-chlorofluoroethylene. These monoolefins may be copolymerized with each other in groups of two or more. They may also be copolymerized with minor amounts of other olefinic compounds such as ethylene or bromotrifluoroethylene. The preferred polymers are copolymers of vinylidene fluoride with at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl (e.g. perfluoroalkyl) or fluoroalkoxy radical, particularly perfluoropropene, tetrafluoroethylene, chlorotrifluoroethylene and 1-hydroperfluoropropene. Particularly preferred are the fluorinated polymers produced by copolymerizing perfluoropropene and vinylidene fluoride, as described in U.S. Pat. Nos. 3,051,677 issued Aug. 28, 1962 and 3,318,854, issued May 9, 1967 and those polymers produced by copolymerizing perfluoropropene, vinylidene fluoride and tetrafluoroethylene as described in U.S. Pat. No. 2,968,649 issued Jan. 17, 1961. The copolymers of perfluoropropene and vinylidene fluoride having between about 15 and about 50 mole percent perfluoropropene, optionally with the addition of up to 5 to 30 mole percent tetrafluoroethylene, are particularly useful.

An essential ingredient in the final curable composition is at least one aromatic polyhydroxy compound which can be any known aromatic polyhydroxy compound capable of functioning as a crosslinking agent or co-curative for the fluorinated elastomer. Such co-curatives are well-known and are described in the literature, e.g., U.S. Pat. Nos. 3,243,411 and 3,502,628. For example, representative aromatic polyhydroxy compounds include any one of the following: di-, tri-, and tetrahydroxy- benzenes, naphthalenes, and anthracenes, and bisphenols of the formula

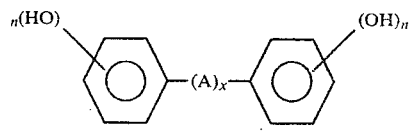

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; x is 0 or 1; n is 1 or 2; and any aromatic ring of the polyhydroxy compound is optionally substituted with at least one atom of chlorine, fluorine, or bromine, or carboxyl or an acyl or alkyl (e.g., a —COR where R is H or a C$_1$–C$_8$ alkyl, aryl or cycloalkyl group) radical. It will be understood from the above bisphenol formula that the —OH groups can be attached in any position (other than number one) in either ring. Blends of two or more such compounds can also be used. One of the most useful aromatic polyphenols is the bisphenol compound known as Bisphenol AF, which is hexafluoroisopropylidene-bis(4-hydroxybenzene). The compounds 4,4'-dihydroxydiphenyl sulfone (Bisphenol S) and isopropylidene-bis(4-hydroxybenzene) or Bisphenol A are also considered as very useful bisphenols. Another very useful aromatic polyhydroxy compound is hydroquinone. Others are illustrated by such dihydroxybenzenes as catechol, resorcinol, 2-methyl resorcinol, 5-methyl resorcinol, 2-methyl hydroquinone, 2,5-dimethyl hydroquinone, and 2-t-butyl hydroquinone; also included are such compounds as 1,5-dihydroxynaphthalene and 9,10-dihydroxyanthracene. Others are illustrated as follows:

1,4,9,10-tetrahydroxyanthracene;
2,2',4,4'-tetrahydroxybenzophenone;
2,4-dihydroxybenzophenone;
2,4-dihydroxybenzoic acid;
4,4'-dihydroxytetraphenylmethane;
2,6-dihydroxyanthraquinone;
3,6-dihydroxyxanthone;
2,4-dihydroxyacetophenone;
4,4'-dihydroxybenzophenone;
4,4'-dihydroxydiphenyl sulfoxide;
2,4-dibenzoylresorcinol.

When changing from one aromatic polyhydroxy compound to another in a given composition, one skilled in the art will be able to select a curing time and temperature that will give a suitable rate of cure for a particular application.

Referring to the bisphenol formula shown above, when A is alkylene, it can be for example, methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, pentachloropentamethylene, pentafluoropentamethylene, and hexamethylene. When A is alkylidene, it can be, for example, ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene. Furthermore, A can be an arylene radical such as m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, and 2,6-naphthylene.

A further essential component in the final curing recipe is an inorganic acid acceptor. Suitable acid acceptors are generally inorganic bases and include magnesium oxide, lead oxide, calcium oxide, calcium hydroxide, dibasic lead phosphite, zinc oxide, barium carbonate, strontium hydroxide, etc. The preferred acid acceptors are magnesium oxide and calcium hydroxide. These bases can be used singly or in combination and preferably are used in amounts ranging from 2 to 25 parts per 100 parts by weight of polymer.

Crosslinking (i.e., vulcanizing or curing) of fluorinated elastomers with aromatic polyhydroxy compounds must be carried out in the presence of a co-curative which may also be referred to as a catalyst or a vulcanization accelerator. According to this invention, a sulfonium compound or a mixture of sulfonium compounds is used as a co-curative. It is quite unexpected that sulfonium compounds function so effectively as accelerators for the cure of a fluoroelastomer in the presence of the other ingredients of the composition, especially because the cured product exhibits such increased resistance to deterioration, even under adverse conditions.

As used herein the expression "sulfonium compound" means an organic compound in which at least one sulfur atom is covalently bonded to three organic moieties having from 1 to 20 carbon atoms by means of carbon-sulfur covalent bonds and is ionically associated with an anion. The sulfonium compounds may have more than one relatively positive sulfur atom, e.g.,

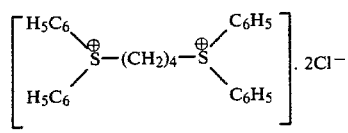

and 2 of the carbon-sulfur covalent bonds may be between the carbon atoms of a divalent organic moiety, i.e., the sulfur atom may be a heteroatom in a cyclic structure. The preferred class of sulfonium compounds herein broadly comprises relatively positive and relatively negative ions (the sulfur atoms generally comprising the central atom of the positive ion), these compounds being generally known as sulfonium salts.

A particularly preferred class of sulfonium salts for use herein is aromatic sulfonium complex salt which can be defined by the formula

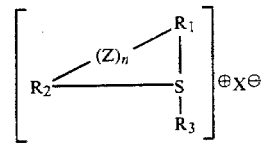

wherein $R_1$, $R_2$ and $R_3$ can be the same or different, provided that at least one of such groups is aromatic, and such groups can be selected from aromatic groups having 4 to 20 carbon atoms (e.g., substituted and unsubstituted phenyl, thienyl, and furanyl) and alkyl radicals having 1 to 20 carbon atoms. The term "alkyl" as used here is meant to include substituted alkyl radicals (for example, substituents such as halogen, hydroxy, alkoxy, aryl). Preferably, $R_1$, $R_2$ and $R_3$ are each aromatic. Z is selected from the group consisting of oxygen; sulfur; $>S=O$; $>C=O$;

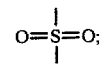

$R_4$—N where

is aryl or acyl (such as acetyl, benzoyl, etc.); a carbon-to-carbon bond; or

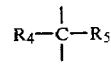

where $R_4$ and $R_5$ are selected from the group consisting of hydrogen, an alkyl radical having 1 to 4 carbon atoms, and an alkenyl radical having 2 to 4 carbon atoms; and n is zero or 1; and $X^-$ is an anion. Suitable representative anions include chloride, bromide, sulfate, bisulfate, nitrate, hydroxide, perchlorate, trifluoromethane sulfonate, acetate, benzene sulfonate, phenate, tetrafluoborate, hexachlorophosphate, hexafluorophosphate, hexachlorostannate, hexafluoroarsenate, hexafluoroantimonate.

Aromatic sulfonium salts are known and recognized in the art. Triaryl-substituted sulfonium compounds, for example, can be prepared by the procedure described in G. H. Wiegand, et al., "Sythesis and Reactions of Triarylsulfonium Halides", *J. Org. Chem.* 33, 2671–75 (1968). Aromatic sulfonium salts also having alkyl-substitution can be prepared by the procedures described in K. Ohkubo et al., *J. Org. Chem.* 36, 3149–55 (1971) or U.S. Pat. No. 4,120,866 (Winkler). A preferred method for making triaryl-substituted sulfonium compounds is described in U.S. Pat. No. 2,807,648, incorporated herein by reference. Complex sulfonium salts can be prepared from the corresponding simple salts, such as the halide salts, by metathesis with a metal or ammonium salt of the complex anion desired. For example, the chloride can be dissolved in methanol and reacted with silver oxide to provide the hydroxide. The hydroxide can be used as is or it can be converted to other salts by reaction with the corresponding organic or inorganic acid.

The aromatic sulfonium compounds are substituted with at least one, and preferably three, aromatic groups. Representative groups are aromatic groups having 4 to 20 carbon atoms. These aromatic groups may optionally have one or more fused benzo rings (e.g., naphthyl and the like; benzothienyl, dibenzothienyl; benzofuranyl, dibenzofuranyl; etc.). Such aromatic groups may also be substituted, if desired, by one or more neutral groups, e.g., halogen, nitro, hydroxyl, carbonyl, arylanilino groups, ester groups (e.g., alkoxycarboxyl such as methoxycarbonyl and ethoxycarbonyl, phenoxycarbonyl and acyloxy such as acetoxy and propionyloxy), sulfo ester groups (e.g., alkoxysulfonyl such as methoxysulfonyl and butoxysulfonyl, phenoxysulfonyl, and the like), amido groups (e.g., acetamido, butyramido, ethylsulfonamido, and the like), carbamyl groups (e.g., carbamyl, N-alkylcarbamyl, N-phenylcarbamyl, and the like), sulfamyl groups (e.g., sulfamyl, N-alkylsulfamyl, N,N-dialkylsulfamyl, N-phenylsulfamyl, and the like), alkoxy groups (e.g., methoxy, ethoxy, butoxy, and the like), aryl groups (e.g., phenyl), alkyl groups (e.g., methyl, ethyl, butyl, and the like) aryloxy groups (e.g., phenoxy), alkylsulfonyl (e.g., methylsulfonyl, ethylsulfonyl, and the like), arylsulfonyl groups (e.g., phenylsulfonyl groups), perfluoroalkyl groups (e.g., trifluoromethyl, perfluoroethyl, and the like), and perfluoroalkylsulfonyl groups (e.g., trifluoromethylsulfonyl, perfluorobutylsulfonyl, and the like).

The triaryl-substituted sulfonium salts, such as triphenyl sulfonium chloride, are the preferred compounds for use herein. The diaryl alkyl sulfonium salts are suitable but cure the fluoropolymers herein more slowly than the triaryl salts. The aryl dialkyl salts effectuate fluoropolymer cure even more slowly than diaryl alkyl sulfonium salts.

Suitable examples of the aromatic sulfonium salt accelerators include:
triphenylsulfonium chloride
methyldiphenylsulfonium tetrafluoroborate
triphenylsulfonium hexafluorophosphate
triphenylsulfonium sulfate
diphenylnaphthylsulfonium trifluoromethane sulfonate
tritolysulfonium nitrate
anisyldiphenylsulfonium hexafluoroantimonate
4-butoxyphenyldiphenylsulfonium tetrafluoroborate
4-chlorophenyldiphenylsulfonium acetate
tris(4-phenoxyphenyl)sulfonium hexafluorophosphate
di(4-ethoxyphenyl)methylsulfonium hexafluoroarsenate
4-acetoxy-phenyldiphenylsulfonium carbonate
tris(4-thiomethoxyphenyl)sulfonium hexafluorophosphate
di(methoxysulfonylphenyl)methylsulfonium chloride
di(methoxynaphthyl)methylsulfonium tetrafluoroborate
tri(carbomethoxyphenyl)sulfonium hexafluorophosphate
4-acetamidophenyldiphenylsulfonium perchlorate
methyl(N-methylphenothiazinyl)sulfonium bromide The sulfonium compound and aromatic polyhydroxy compound may be conveniently milled into the polymer gum stock. Thus mixed, the gum stock can generally be stored at room temperature (i.e., about 27° C.) for extended periods, e.g., a year or more. Prior to curing, the inorganic acid acceptor is milled into the sulfonium-aromatic polyhydroxy compound containing gum stock, after which the storage life of the stock is more limited. Of course, all of the components of the curing system (i.e., the sulfonium compound, the inorganic acid acceptor and the aromatic polyhydroxy compound) may be admixed prior to their incorporation into the polymer gum stock without departing from the scope of the invention. In some instances it may be desirable to add accelerators, retarding agents, processing aids, plasticizers, fillers and other conventional additives to the gum stock.

The proportions of components of the curing system are set forth below in Table I. Amounts referred to therein are in moles per hundred parts rubber (fluoropolymer) abbreviated "mhr" or in parts per hundred parts by weight of rubber abbreviated "phr," unless otherwise indicated. These proportions are general ranges and the particular amount for each particular cure, time, and temperature will become apparent to those skilled in the art.

TABLE I

| Component | Formulation Ranges Amounts |
|---|---|
| Acid Acceptor | 0.5–40 phr |
| Sulfonium compound | (2 to 50) × $10^{-4}$ mhr |
| Aromatic polyhydroxy compound | (3 to 100) × $10^{-4}$ mhr |

Useful elastomers are obtained within the aforementioned formulation limits, although elastomeric products having particularly desired properties may be obtained by varying the relative amounts of the components within the specified ranges. Low concentrations of sulfonium compounds generally will give slower cures but improved thermal aging. Lower concentrations of acid acceptors generally will give improved thermal aging, but slower cures. By varying the concentration of the aromatic polyhydroxy compound in the admixture one can vary the crosslink density. Lower crosslink density generally tends to produce fluoroelastomers having improved elongation and poorer resistance to compression set. Conversely, a higher crosslink density tends to produce fluoroelastomers with lower elongation and better resistance to compression set.

In accordance with this invention, the desired amount of the components of the crosslinking system is added to the unvulcanized fluorocarbon polymer (i.e., gum stock) and is intimately admixed therewith or compounded by employing any of the usual rubber mixing devices, such as Banbury mixers, roll mills, or any other convenient mixing device. It has been found that a two-roll rubber mill equipped with heat exchange means, e.g., cored chambers for cooling, is particularly suitable since the heat generated by the high shearing forces in mixing can be dissipated and the temperature more accurately regulated with this device than with devices providing other means for temperature control.

For best results the temperature of the mixture on the mill is not allowed to rise above about 120° C. During milling it is necessary to distribute the crosslinking agent uniformly throughout the curable polymer. However, it is also necessary to prevent extensive crosslinking in the compounding step since these fluorinated polymers can be molded or extruded only with great difficulty after a substantial amount of crosslinking has taken place.

The curing process typically comprises extrusion or pressing the compounded mixture in a mold, and subsequently baking in an oven. Pressing of the compounded mixture (press cure) is conducted at a temperature between about 95° C. and about 230° C., preferably between about 150° C. and about 205° C. for a period of from 1 minute to about 15 hours, usually from 5 minutes to 30 minutes. A pressure of between about 700 kPa and about 20,600 kPa, preferably between about 3,400 kPa and about 6,800 kPa is imposed on the compounded mixture in the mold. The molds first may be coated with a release agent, such as a silicone oil, and prebaked. The molded vulcanizate is then usually post cured (oven cured) at a temperature between about 150° C. and about 315° C., usually at about 260° C. for a period of from about 2 hours to 50 hours or more depending on the cross-sectional thickness of the sample. For thick sections, the temperature during the post cure is usually raised gradually from the lower limit of the range to the desired maximum temperature selected. For thinner sections, e.g., less than 5 mm, the section may be put into the oven at the desired maximum temperature. The maximum temperature used is preferably about 260° C. and is held at this value for about 4 hours or more.

EXAMPLES

The following examples are offered to aid in a better understanding of the present invention and are not to be unnecessarily construed as limiting the scope thereof. In the examples, indicated results were obtained using the following test methods:

| | |
|---|---|
| Tensile Strength at Break | ASTM D 412-75 on a sample |
| Elongation at Break | cut from 1.8 mm sheet |
| Modulus at 100% Elongation | with a die having the following dimensions: A = 3.5 mm L = 19 mm C = 51 mm |
| Accelerated Aging | ASTM D 573-72 exposed for the indicated time at 275° C. |
| Press Cure | Unless otherwise noted, 150 × 150 × 1.8 mm sheets were prepared for physical property determination by pressing at about 6.9 × 10³ kPa for 10 min. at 177° C. |
| Post Cure | Samples were removed from the press and placed in a circulating air oven. The oven was maintained at 260° C. for 16 hours. |
| Cure Characteristics | ASTM D 2084-75 with a 20 min. preheat, an oscillator frequency of 100 cpm and a 3° arc. Minimum torque ($M_L$) and a torque attained at a stated time for a curve where no plateau or maximum value had been reached ($M_H$) were reported. Also reported were $t_{sl}$ (time for torque to increase 0.1 N·m above $M_L$) and $t_c'(90)$ (time for torque to reach $M_L + 0.9 (M_H - M_L)$. |

EXAMPLE 1

Illustrating the use of aromatic sulfonium salt to cure a fluoroelastomer.

An aromatic sulfonium salt was prepared according to the procedure of Example 1 of U.S. Pat. No. 2,807,648. The product, crude triphenyl sulfonium chloride, was further purified by dissolving it in methanol, filtering the resulting solution and vacuum distilling the solution at about 60° C. to generate pale yellow crystals. The corresponding xylyl (mixed) and tolyl derivatives were prepared by substituting the corresponding hydrocarbons for the benzene of Example 1.

One hundred parts by weight vinylidene fluoride/hexafluoropropane copolymer gum stock (80/20 mole ratio of the monomers, respectively), commercially available from the 3 M Company under the trade designation "Fluorel" was added to a 2 roll rubber mill. Separate methanol solutions containing the specified quantities of the respective aromatic sulfonium compounds and hexafluoro isopropylidene bis(4-hydroxybenzene) ($BF_6$) were added to the rubber mill. After being thoroughly mixed the carbon black filler (medium thermal black, hereafter "MT"), calcium hydroxide, magnesium oxide acid acceptors, tetramethylene sulfone (TMS) accelerator and dichlorodiphenylsulfone (DCDPS) processing aid were blended into the rubber until a uniform mixture was obtained. Using the above described tests, the cure characteristics were determined and the physical properties of the vulcanizate then were measured after cure and exposure to elevated temperatures. These results appear in table I, Run 1, in comparison with results of a run ("Run 2") in which conventional triphenyl benzyl phosphonium chloride accelerator was used.

Table I

| Composition | Run 1 | Run 2 |
|---|---|---|
| $C_3F_6/CF_2=CH_2$ (20/80 mole ratio) | 100 | 100 |
| MT Black (phr) | 30 | 30 |
| Ca(OH)$_2$ (phr) | 4 | 4 |
| MgO (phr) | 3 | 3 |
| TMS (phr) | 1 | 1 |
| DCDPS (phr) | 1 | 1 |
| $BF_6$ (mhr × 10³) | 4.8 | 4.8 |
| Triphenylsulfonium Chloride (mhr × 10³) | 1.28 | — |
| Triphenylbenzylphosphonium Chloride (mhr × 10³) | — | 1.28 |
| Rheometer 177° C., 3° arc, 100 cpm | | |
| $M_L$ (N · m) | 0.74 | 0.86 |
| $M_H$ (N · m) | 4.69 | 8.34 |
| min to $M_H$ | 24 | 12 |
| $t_{sl}$ | 7.2 | 3.5 |
| $t_c'(90)$ | 12.5 | 6.5 |
| Press Cure 177° C. | | |
| Time (min) | 24 | 12 |
| Tensile (MPa) | 7.77 | 8.95 |
| 100% Modulus (MPa) | 2.61 | 2.76 |
| Elongation at break (%) | 493 | 373 |
| Hardness (Shore A$_2$) | 76 | 74 |
| Post Cure 16 hr at 260° C. | | |
| Tensile (MPa) | 11.91 | 14.30 |
| 100% Modulus (MPa) | 3.6 | 4.45 |
| Elongation at break (%) | 380 | 263 |
| Hardness (Shore A$_2$) | 80 | 79 |
| Aged 72 hr. at 275° C. | | |
| Tensile (MPa) | 7.46 | 9.88 |
| 100% Modulus (MPa) | 2.39 | 3.33 |
| Elongation at break (%) | 457 | 280 |
| Hardness (Shore A$_2$) | 84 | 83 |
| Aged 1 week at 275° C. | | |

Table I-continued

| Composition | Run 1 | Run 2 |
|---|---|---|
| Tensile (MPa) | 5.03 | 7.32 |
| 100% Modulus (MPa) | 2.52 | 3.74 |
| Elongation at break (%) | 380 | 227 |
| Hardness (Shore $A_2$) | 86 | 86 |
| Aged 2 weeks at 275° C. | | |
| Tensile (MPa) | 4.71 | 6.75 |
| 100% Modulus (MPa) | 3.46 | — |
| Elongation at break (%) | 180 | 100 |
| Hardness (Shore $A_2$) | 88 | 91 |
| Aged 3 weeks at 275° C. | | |
| Tensile (MPa) | 4.42 | 6.61 |
| 100% Modulus (MPa) | — | — |
| Elongation at break (%) | 60 | 30 |
| Hardness (Shore $A_2$) | 94 | 95 |

EXAMPLE 2

Showing the effect of various triphenyl sulfonium salt anions on the physical properties and cure characteristics of fluoroelastomers.

Fluoroelastomers were prepared according to the procedure of Example 1 using triphenyl sulfonium salts having various anions. The composition, cure characteristics and physical properties of the resulting cured fluoroelastomers appear in Table II.

Table II

| Composition | Run 3 | Run 4 | Run 5 |
|---|---|---|---|
| $C_3F_6/CF_2=CH_2$ (20/80 mole ratio) | 100 | 100 | 100 |
| MT (phr) | 30 | 30 | 30 |
| $Ca(OH)_2$ (phr) | 6 | 6 | 6 |
| MgO (phr) | 3 | 3 | 3 |
| TMS (phr) | 1 | 1 | 1 |
| DCDPS (phr) | 1 | 1 | 1 |
| Triphenylsulfonium Floride (mhr × $10^3$) | 1.28 | — | — |
| Triphenylsulfonium Bisulfate (mhr × $10^3$) | — | 1.28 | — |
| Triphenylsulfonium Hexafluorophosphate (mhr × $10^3$) | — | — | 1.28 |
| $BF_6$ (mhr × $10^3$) | 4.8 | 4.8 | 4.8 |
| Rheometer 177° C., 3° arc, 100 cpm | | | |
| $M_L$ N · m) | 0.59 | 0.69 | 0.57 |
| $M_H$ N · m) | 6.06 | 5.14 | 4.00 |
| Min to $M_H$ | 12 | 14 | 24 |
| $t_{s1}$ | 5.7 | 5.8 | 6.4 |
| $t_c'(90)$ | 9.0 | 9.3 | 11.0 |
| Press Cure 177° C. | | | |
| Time (min) | 15 | 15 | 15 |
| Tensile (MPa) | 8.46 | 8.38 | 6.53 |
| 100% Modulus (MPa) | 2.61 | 2.54 | 1.88 |
| Elongation at break (%) | 370 | 427 | 550+ |
| Hardness (Shore $A_2$) | 77 | 76 | 73 |
| Post Cure 16 hr. at 260° C. | | | |
| Tensile (MPa) | 13.29 | 11.81 | 10.55 |
| 100% Modulus (MPa) | 3.48 | 2.87 | 2.37 |
| Elongation at break (%) | 307 | 323 | 373 |
| Hardness (Shore $A_2$) | 77 | 81 | 76 |

EXAMPLE 3

Showing the effect of various aromatic groups upon the physical properties and cure characteristics of fluoroelastomers cured with aromatic sulfonium salts.

Fluoroelastomers were prepared according to the procedure of Example 1 using aromatic sulfonium salt accelerator with different aromatic groups. The composition, cure characteristics and tensile properties of the resulting fluoroelastomers appear in Table III.

Table III

| Composition | Run 6 | Run 7 | Run 8 | Run 9 |
|---|---|---|---|---|
| $C_3F_6/CF_2=CH_2$ (20/80 mole ratio) | 100 | 100 | 100 | — |
| $C_3F_6/C_2F_4/CF_2=CH_2$ (18/16/66 mole ratio) | — | — | — | 100 |
| MT (phr) | 30 | 30 | 30 | 30 |
| $Ca(OH)_2$ (phr) | 6 | 6 | 6 | 6 |
| MgO (phr) | 3 | 3 | 3 | 3 |
| TMS (phr) | 1 | 1 | 1 | 1 |
| DCDPS (phr) | 1 | 1 | 1 | 1 |
| Tritolylsulfonium Chloride (mhr × $10^3$) | 1.28 | — | — | 1.28 |
| Diphenylethylsulfonium Bromide (mhr × $10^3$) | — | — | 2.56 | — |
| Trixylylsulfonium Chloride (mhr × $10^3$) | — | 1.28 | — | — |
| $BF_6$ (mhr × $10^3$) | 4.8 | 4.8 | 4.8 | 4.8 |
| Rheometer 177° C., 3° arc, 100 cpm | | | | |
| $M_L$ (N · m) | 0.91 | 0.91 | 0.57 | 1.64 |
| $M_H$ (N · m) | 6.17 | 7.31 | 3.39 | 10 |
| min to $M_H$ | 12 | 12 | 48 | 28 |
| $t_{s1}$ | 3.9 | 3.3 | 6.7 | 10.0 |
| $t_c'(90)$ | 6.7 | 5.2 | 38.0 | 21.0 |
| Press Cure 177° C. | | | | |
| Time (min) | 10 | 10 | 60 | 24 |
| Tensile (MPa) | 8.99 | 8.61 | 9.05 | 10.92 |
| 100% Modulus (MPa) | 2.68 | 2.98 | 2.14 | 3.94 |
| Elongation at Break (%) | 370 | 293 | 360 | 313 |
| Hardness (Shore $A_2$) | 78 | 74 | 72 | 78 |
| Post Cure 16 hr. at 260° C. | | | | |
| Tensile (MPa) | 12.43 | 12.97 | 12.05 | 17.38 |
| 100% Modulus (MPa) | 3.40 | 4.26 | 4.39 | 6.48 |
| Elongation at Break (%) | 285 | 233 | 200 | 197 |
| Hardness (Shore $A_2$) | 80 | 79 | 77 | 82 |

EXAMPLE 4

Showing the physical properties and curing characteristics of cured fluoroelastomers with various aromatic polyhydroxy compounds prepared according to Example 1. Results are in Table IV.

Table IV

| Composition | Run 10 | Run 11 | Run 12 | Run 13 |
|---|---|---|---|---|
| $C_3F_6/CF_2=CH_2$ (20/80 mole ratio) | 100 | 100 | 100 | 100 |
| MT (phr) | 30 | 30 | 30 | 30 |
| $Ca(OH)_2$ (phr) | 6 | 6 | 6 | 6 |
| MgO (phr) | 3 | 3 | 3 | 3 |
| TMS (phr) | 1 | 1 | 1 | 1 |
| DCDPS (phr) | 1 | 1 | 1 | 1 |
| Trixylylsulfonium Chloride (mhr × $10^3$) | 2.56 | 2.56 | 2.56 | — |
| Triphenylsulfonium Chloride (mhr × $10^3$) | — | — | — | 2.56 |
| 1,5-Dihydroxynaphthalene (mhr × $10^3$) | 4.8 | — | — | — |
| 4,4'-Dihydroxybenzophenone (mhr × $10^3$) | — | 4.8 | — | — |
| 4,4'-Dihydroxyphenylsulfone (mhr × $10^3$) | — | — | 4.8 | — |
| 2,4-Dihydroxybenzophenone (mhr × $10^3$) | — | — | — | 4.8 |
| Rheometer 177° C., 3° arc, 100 cpm | | | | |
| $M_L$ (N · m) | 0.82 | 1.37 | 1.20 | 1.37 |
| $M_H$ N · m) | 6.06 | 5.49 | 5.37 | 5.94 |
| min to $M_H$ | 12 | 12 | 12 | 12 |
| $t_{c1}$ | 1.5 | 1.6 | 1.8 | 2.1 |
| $t_c'(90)$ | 3.2 | 6.8 | 5.5 | 4.8 |
| Press cure 177° C. | | | | |
| Time (min) | 10 | 10 | 10 | 10 |

Table IV-continued

| Composition | Run 10 | Run 11 | Run 12 | Run 13 |
|---|---|---|---|---|
| Tensile (MPa) | 9.22 | 9.66 | 9.25 | 9.80 |
| 100% Modulus (MPa) | 2.75 | 2.63 | 2.75 | 2.52 |
| Elongation to Break (%) | 367 | 340 | 377 | 380 |
| Hardness (Shore A$_2$) | 77 | 75 | 78 | 74 |
| Post Cure 16 hr at 260° C. | | | | |
| Tensile (MPa) | 11.85 | 10.70 | 10.95 | 12.27 |
| 100% Modulus (MPa) | 5.11 | 4.46 | 4.68 | 2.50 |
| Elongation to Break (%) | 190 | 190 | 203 | 347 |
| Hardness (Shore A$_2$) | 84 | 81 | 83 | 75 |

What is claimed is:

1. An admixture curable in reactive association with an inorganic acid acceptor to product a cured elastomer and comprising the following components:

(a) an elastomeric copolymer of vinylidene fluoride and at least one terminally unsaturated fluoromonolefin containing at least one fluorine atoms substituent on each double bonded carbon atom, each cabon atom of said fluoromonoolefin being substituted only with fluorine, chlorine, hydrogen or lower fluoroalkyl or fluoroalkoxy radical, at least 10 percent of the chain carbon atoms of said copolymer being —CH$_2$— units;

and as co-curatives for said copolymer:

(b) at least one triorgano sulfonium compound in which at least one sulfur atom is covalently bonded to three organic moieties having 1 to 20 carbon atoms by means of carbon-sulfur covalent bonds and is ionically associated with an anion, wherein the sulfonium compound is an aromatic sulfonium salt of the formula

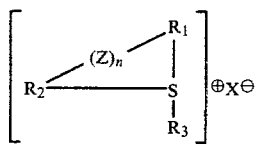

wherein R$_1$, R$_2$ and R$_3$ are selected from the group consisting of aromatic groups having 4 to 20 carbon atoms and alkyl radicals having 1 to 20 carbon atoms; wherein at least one of R$_1$, R$_2$, and R$_3$ is aromatic; wherein Z is selected from the group consisting of oxygen, sulfur,

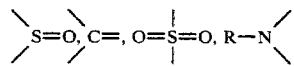

where R is aryl or acyl, a carbon-to-carbon bond, or $$R_4 - \underset{|}{\overset{|}{C}} - R_5$$

where R$_4$ and R$_5$ are selected from the group consisting of hydrogen, an alkyl radical having 1 to 4 carbon atoms, and an alkenyl radical having 2 to 4 carbon atoms; n is 0 or 1; and X is an anion, and (c) at least one aromatic polyhydroxy compound.

2. A curable admixture according to claim 1 wherein R$_1$, R$_2$ and R$_3$ are aromatic having 4 to 20 carbon atoms.

3. The curable admixture of claim 1 wherein said sulfonium compound is present in an amount from $2 \times 10^{-4}$ moles per hundred parts copolymer to $50 \times 10^{-4}$ moles per hundred parts copolymer.

4. The curable admixture of claim 3 wherein said aromatic polyhydroxy compound is present in an amount from $3 \times 10^{-4}$ moles per hundred parts copolymer to $100 \times 10^{-4}$ moles per hundred parts copolymer.

5. A curable admixture according to claim 1 in which said admixture also contains from 0.5 to about 40 parts by weight, based upon 100 parts by weight of elastomeric copolymer, of an inorganic acid acceptor.

6. An admixture curable in reactive association with an inorganic acid acceptor to produce a cured elastomer, and comprising the following components:

(a) an elastomeric copolymer of vinylidene fluoride and at least one terminally unsaturated fluoromonolefin containing at least one fluorine atom substituent on each double bonded carbon atom, each carbon atom of said fluoromonoolefin being substituted only with fluorine, chlorine, hydrogen or a lower fluoroalkyl or fluoroalkoxy radical, at least 10 percent of the chain carbon atoms of said copolymer being —CH$_2$— units;

and as co-curatives for said copolymer:

(b) at least one triorgano sulfonium compound in which at least one sulfur atom is covalently bonded to three organic moieties having 1 to 20 carbon atoms by means of carbon-sulfur covalent bonds and is ionically associated with an anion, wherein each of the organic moieties of said sulfonium compound is an aryl having from 4 to 20 carbon atoms; and (c) at least one aromatic polyhydroxy compound.

7. A curable admixture according to claim 6 wherein said sulfonium compound is triphenyl sulfonium chloride.

* * * * *